US008483735B2

(12) United States Patent
Manssour et al.

(10) Patent No.: US 8,483,735 B2
(45) Date of Patent: Jul. 9, 2013

(54) METHODS AND APPARATUS FOR PARALLEL SCHEDULING OF FREQUENCY RESOURCES FOR COMMUNICATION NODES

(75) Inventors: Jawad Manssour, Stockholm (SE); Christian Skärby, Stockholm (SE); Ying Sun, Sundbyberg (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 404 days.

(21) Appl. No.: 12/869,317

(22) Filed: Aug. 26, 2010

(65) Prior Publication Data

US 2012/0052894 A1     Mar. 1, 2012

(51) Int. Cl.
*H04B 7/00* (2006.01)

(52) U.S. Cl.
USPC ............................ 455/509; 370/252; 370/329

(58) Field of Classification Search
USPC .......................................................... 455/509
See application file for complete search history.

(56) References Cited

U.S. PATENT DOCUMENTS

| | | | | |
|---|---|---|---|---|
| 5,815,793 | A * | 9/1998 | Ferguson ....................... | 725/131 |
| 6,516,350 | B1 * | 2/2003 | Lumelsky et al. ............ | 709/226 |
| 6,625,136 | B1 * | 9/2003 | Niegel et al. .................. | 370/335 |
| 7,024,188 | B2 * | 4/2006 | Khun-Jush et al. ........... | 455/423 |
| 7,027,773 | B1 * | 4/2006 | McMillin ...................... | 455/41.2 |
| 7,313,620 | B2 * | 12/2007 | Odhner et al. ................ | 709/226 |
| 7,664,126 | B2 * | 2/2010 | Funato .......................... | 370/412 |
| 7,668,728 | B2 * | 2/2010 | Jain ............................... | 705/1.1 |
| 7,673,054 | B2 * | 3/2010 | Bozak et al. .................. | 709/228 |
| 7,688,846 | B2 * | 3/2010 | Calcev et al. ................. | 370/445 |
| 7,698,639 | B2 * | 4/2010 | Kamdar et al. ............... | 715/235 |
| 7,742,767 | B2 * | 6/2010 | Chindapol et al. ............ | 455/443 |
| 7,752,311 | B2 * | 7/2010 | Walker et al. ................. | 709/226 |

(Continued)

FOREIGN PATENT DOCUMENTS

| | | |
|---|---|---|
| EP | 2 068 579 A1 | 6/2009 |
| EP | 2 124 469 A1 | 11/2009 |

(Continued)

OTHER PUBLICATIONS

International Search Report, PCT International Application No. PCT/SE2010/050919, Apr. 28, 2011.

(Continued)

*Primary Examiner* — Hai V Nguyen
(74) *Attorney, Agent, or Firm* — Myers Bigel Sibley & Sajovec, P.A.

(57) ABSTRACT

Various schedulers are disclosed for use within a network node of a radio access network. A scheduler can be configured to divide a defined frequency bandwidth into a plurality of bandwidth pipes. The scheduler then develops sets of nodes that are candidates for using corresponding ones of the bandwidth pipes to communicate with the network node during a communication time interval. At least one of the sets contains a plurality of candidate nodes. The scheduler operates separate parallel processes that are arranged for computing metrics for the sets of nodes. The scheduler assigns one of the nodes in each set of nodes to the corresponding bandwidth pipe in response to the computed metrics. The scheduler may divide the defined frequency bandwidth into a plurality of non-overlapping bandwidth pipes so that metrics for candidate nodes in one of the sets can be computed independently from candidate nodes in another one of the sets.

23 Claims, 6 Drawing Sheets

U.S. PATENT DOCUMENTS

| | | | |
|---|---|---|---|
| 7,770,200 B2 * | 8/2010 | Brooks et al. | 725/95 |
| 7,809,914 B2 * | 10/2010 | Kottomtharayil et al. | 711/170 |
| 7,810,093 B2 * | 10/2010 | Jones et al. | 718/102 |
| 8,005,957 B2 * | 8/2011 | Marr et al. | 709/226 |
| 8,064,937 B2 * | 11/2011 | Obuchi et al. | 455/502 |
| 8,064,938 B2 * | 11/2011 | Aaron et al. | 455/509 |
| 8,098,603 B2 * | 1/2012 | Krishnaswamy | 370/310 |
| 8,107,897 B2 * | 1/2012 | Imamura | 455/101 |
| 8,111,743 B2 * | 2/2012 | Imamura | 375/232 |
| 8,116,708 B2 * | 2/2012 | Imamura | 455/205 |
| 8,121,184 B2 * | 2/2012 | Imamura | 375/232 |
| 8,121,559 B2 * | 2/2012 | Imamura | 455/91 |
| 8,135,337 B2 * | 3/2012 | Larsson | 455/11.1 |
| 8,170,512 B2 * | 5/2012 | Imamura | 455/205 |
| 8,208,000 B1 * | 6/2012 | Swanson et al. | 348/14.08 |
| 8,208,421 B2 * | 6/2012 | Dankberg et al. | 370/316 |
| 8,239,573 B2 * | 8/2012 | Brownrigg, Jr. | 709/241 |
| 8,266,260 B2 * | 9/2012 | Pathak et al. | 709/221 |
| 8,325,761 B2 * | 12/2012 | Howard et al. | 370/468 |
| 8,347,170 B2 * | 1/2013 | Chung et al. | 714/752 |
| 8,374,161 B2 * | 2/2013 | Malladi | 370/343 |
| 8,379,552 B2 * | 2/2013 | Krishnaswamy | 370/310 |
| 8,385,246 B2 * | 2/2013 | Sawahashi et al. | 370/312 |
| 8,391,876 B2 * | 3/2013 | Gao et al. | 455/447 |
| 2005/0131865 A1 * | 6/2005 | Jones et al. | 707/2 |
| 2005/0286422 A1 * | 12/2005 | Funato | 370/235 |
| 2008/0186976 A1 | 8/2008 | Axnas et al. | |
| 2008/0205333 A1 | 8/2008 | Budianu et al. | |
| 2010/0034108 A1 * | 2/2010 | Ode | 370/252 |
| 2010/0046445 A1 * | 2/2010 | Sawahashi et al. | 370/329 |
| 2010/0069077 A1 | 3/2010 | Hu et al. | |
| 2010/0081442 A1 | 4/2010 | Kronestedt et al. | |
| 2010/0241881 A1 * | 9/2010 | Barsness et al. | 713/320 |
| 2010/0281166 A1 * | 11/2010 | Buyya et al. | 709/226 |
| 2011/0010602 A1 * | 1/2011 | Chung et al. | 714/752 |
| 2011/0099553 A1 * | 4/2011 | Agarwal et al. | 718/105 |
| 2011/0143766 A1 * | 6/2011 | Sun et al. | 455/452.2 |
| 2011/0302587 A1 * | 12/2011 | Nishikawa et al. | 718/103 |
| 2012/0017218 A1 * | 1/2012 | Branson et al. | 718/104 |
| 2012/0042319 A1 * | 2/2012 | Hildrum et al. | 718/104 |
| 2012/0052894 A1 * | 3/2012 | Manssour et al. | 455/509 |

FOREIGN PATENT DOCUMENTS

| | | |
|---|---|---|
| WO | WO 02/093819 A1 | 11/2002 |
| WO | WO 2004/095851 A2 | 11/2004 |
| WO | WO 2009/046143 A2 | 4/2009 |

OTHER PUBLICATIONS

Written Opinion of the International Searching Authority, PCT International Application No. PCT/SE2010/050919, Apr. 28, 2011.

* cited by examiner

US 8,483,735 B2

METHODS AND APPARATUS FOR PARALLEL SCHEDULING OF FREQUENCY RESOURCES FOR COMMUNICATION NODES

BACKGROUND

In a typical cellular radio system, wireless terminals (also known as mobile stations and/or user equipment units (UEs)) communicate via a radio access network (RAN) to one or more core networks. User equipment units (UE) may include mobile telephones ("cellular" telephones) and/or other processing devices with wireless communication capability, such as, for example, portable, pocket, hand-held, laptop computers, which communicate voice and/or data with the RAN.

The RAN covers a geographical area which is divided into cell areas, with each cell area being served by a base station, e.g., a radio base station (RBS), which in some networks is also called a "NodeB" or enhanced NodeB "eNodeB". A cell is a geographical area where radio coverage is provided by the radio base station equipment at a base station site. The base stations communicate over the air interface operating on radio frequencies with UEs within range of the base stations.

In some versions of the radio access network, several base stations are typically connected (e.g., by landlines or microwave) to a radio network controller (RNC). The radio network controller, also sometimes termed a base station controller (BSC), supervises and coordinates various activities of the plural base stations connected thereto. The radio network controllers are typically connected to one or more core networks.

The Universal Mobile Telecommunications System (UMTS) is a third generation mobile communication system, which evolved from the Global System for Mobile Communications (GSM), and is intended to provide improved mobile communication services based on Wideband Code Division Multiple Access (WCDMA) access technology. UTRAN, short for UMTS Terrestrial Radio Access Network, is a collective term for the Node B's and Radio Network Controllers which make up the UMTS radio access network. Thus, UTRAN is essentially a radio access network using wideband code division multiple access for user equipment units (UEs).

The Third Generation Partnership Project (3GPP) has undertaken to evolve further the UTRAN and GSM based radio access network technologies. In this regard, specifications for the Evolved Universal Terrestrial Radio Access Network (E-UTRAN) are ongoing within 3GPP. The Evolved Universal Terrestrial Radio Access Network (E-UTRAN) comprises the Long Term Evolution (LTE) and System Architecture Evolution (SAE).

FIG. 1 is a simplified block diagram of a Long Term Evolution (LTE) RAN 100. The LTE RAN 100 is a variant of a 3GPP RAM where radio base station nodes (eNodeBs) are connected directly to a core network 130 rather than to radio network controller (RNC) nodes. In general, in LTE the functions of a radio network controller (RNC) node are performed by the radio base stations nodes. Each of the radio base station nodes (eNodeBs) 122-1, 122-2, ... 122-M communicate with UEs (e.g., UE 110-1, 110-2, 110-3, ... 110-L) that are within their respective communication service cells. The radio base station nodes (eNodeBs) can communicate with one another through an X2 interface and with the core network 130 through S1 interfaces, as is well know in the art.

The LTE standard is based on multi-carrier based radio access schemes such as Orthogonal Frequency-Division Multiplexing (OFDM) in the downlink and single carrier (SC)-FDMA in the uplink. The OFDM's spread spectrum technique distributes the data over a large number of carriers that are spaced apart at precise frequencies. This spacing provides the "orthogonality" in this technique which prevents the demodulators from seeing frequencies other than their own. The benefits of OFDM are high spectral efficiency, resiliency to RF interference, and lower multi-path distortion.

A LTE frame can include both downlink portion(s) and uplink portion(s) that are communicated between the base station and UEs. Each LTE frame can include plural subframes, which may each have a 1 ms duration. FIG. 2 illustrates a resource grid for frequency and time resource elements (REs), where frequency subcarriers (e.g., each having 180 kHz frequency bandwidth) are can be assigned to a plurality of UEs for transmitting and/or receiving data with an associated radio base station node eNodeB during assigned subframes (e.g., each having a 1 ms width).

One or more resource schedulers in the LTE RAN 100 assigns the REs for downlink communications (e.g., the downlink shared channel (DL-SCH)) and for uplink communications (e.g., the uplink shared channel (UL-SCH)). The assignments for downlink shared channel (DL-SCH) and uplink shared channel (UL-SCH) are transmitted in a few OFDM symbols at the beginning of each downlink subframe.

The number of rules and metrics that should be considered by LTE and other RAN resource schedulers has substantially increased their processing demands and challenged their ability to efficiently manage resource elements. These resource schedulers are further stressed by demands for dynamic decision making to provide high bit rate packet switched services simultaneous with providing delay sensitive services, such as voice calls, and to make these decisions while adjusting to changing radio conditions to provide increased air interface data capacity. Accordingly, there is a continuing need to develop improved resource schedulers that can process increased numbers of scheduling rules and metrics to provide efficient resource scheduling.

SUMMARY

Some embodiments of the present invention are directed to a scheduler within a network node of a radio access network. The scheduler is configured to divide a defined frequency bandwidth into a plurality of bandwidth pipes. The scheduler then develops sets of nodes that are candidates for using corresponding ones of the bandwidth pipes to communicate with the network node during a communication time interval. At least one of the sets contains a plurality of candidate nodes. The scheduler operates separate parallel processes that are arranged for computing metrics for the sets of nodes. The scheduler assigns one of the nodes in each set of nodes to the corresponding bandwidth pipe in response to the computed metrics.

To increase the processing throughput of the parallel processing operations, the scheduler may divide the defined frequency bandwidth into a plurality of non-overlapping bandwidth pipes. The non-overlapping bandwidth pipes allow the scheduler to operate the parallel processes so that the metrics for the candidate nodes in one of the sets are computed independently from the candidate nodes in another one of the sets. Accordingly, different microprocessors can operate in parallel to compute metrics for candidate nodes in different sets. The scheduler may divide the defined frequency bandwidth into a number of bandwidth pipes that is an integer multiple of the number of microprocessors that are operated to compute the metrics for the candidate nodes.

Other schedulers, network nodes, and/or methods according to embodiments of the invention will be or become apparent to one with skill in the art upon review of the following drawings and detailed description. It is intended that all such additional schedulers, network nodes, and/or methods be included within this description, be within the scope of the present invention, and be protected by the accompanying claims. Moreover, it is intended that all embodiments disclosed herein can be implemented separately or combined in any way and/or combination.

BRIEF DESCRIPTION OF THE DRAWINGS

The accompanying drawings, which are included to provide a further understanding of the invention and are incorporated in and constitute a part of this application, illustrate certain embodiment(s) of the invention. In the drawings.

DETAILED DESCRIPTION

Figure 1:
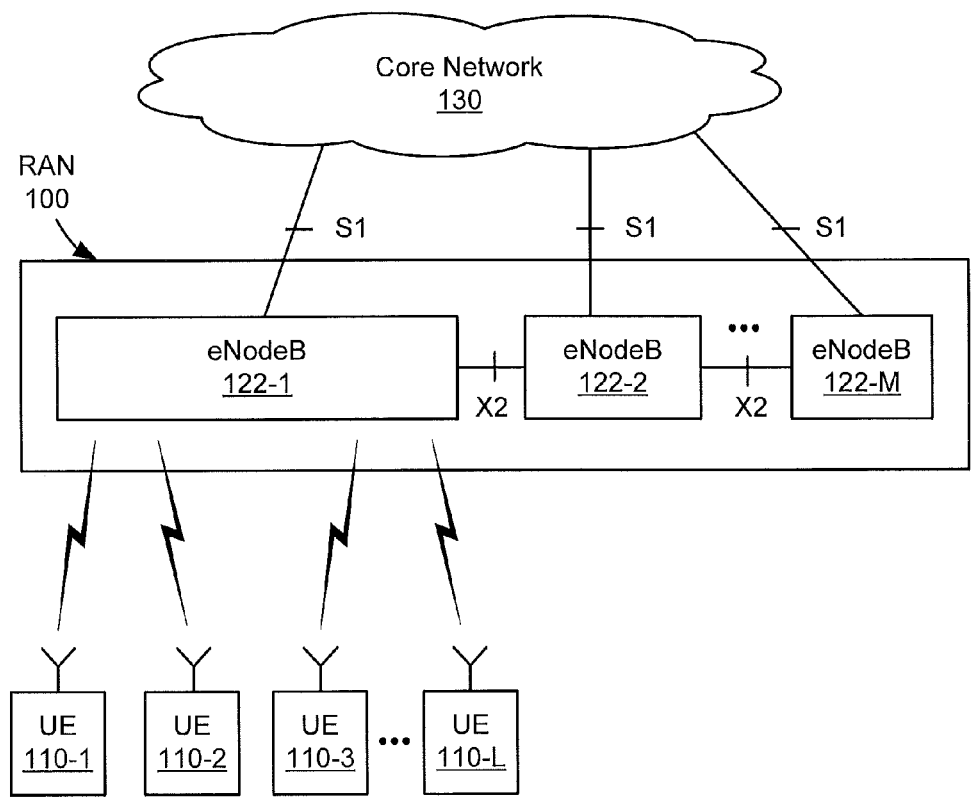
FIG. 1 is a block diagram of a conventional LTE RAN.

The invention will now be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that, when an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. The terminology used herein is for the purpose of describing particular embodiments only and is not intended to be limiting of the invention. As used herein, the singular forms "a", "an" and "the" are intended to include the plural forms as well, unless the context clearly indicates otherwise. Well-known functions or constructions may not be described in detail for brevity and/or clarity.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

As used herein, the term Radio Access Technology (RAT) may include, for example, operations in any of the following Radio Access Technologies: Global Standard for Mobile (GSM) communication, General Packet Radio Service (GPRS), enhanced data rates for GSM evolution (EDGE), DCS, PDC, PCS, code division multiple access (CDMA), wideband-CDMA, CDMA2000, Universal Mobile Telecommunications System (UMTS), 3GPP LTE (3rd Generation Partnership Project Long Term Evolution). Other Radio Access Technologies and/or frequency bands can also be used in embodiments according to the invention.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. If used herein, the common abbreviation "i.e.", which derives from the Latin phrase "id est," may be used to specify a particular item from a more general recitation.

Exemplary embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/BlueRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks.

Accordingly, embodiments of the present invention may be embodied in hardware and/or in software (including firmware, resident software, micro-code, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments have been disclosed herein, in connection with the following description and the drawings. It will be understood that it would be unduly repetitious and obfuscating to literally describe and illustrate every combination and subcombination of these embodiments. Accordingly, the present specification, including the drawings, shall be construed to constitute a complete written description of various exemplary combinations and subcombinations of embodiments and of the manner and process of making and using them, and shall support claims to any such combination or subcombination.

For purposes of illustration and explanation only, various embodiments of the present invention are described herein in the context of a resource scheduler that is operating in a LTE RAN, such as the RAN 100 of FIG. 1. It will be understood, however, that the present invention is not limited to such embodiments and may be embodied generally in any type of resource scheduler for a RAN that is configured to transmit and/or receive according to one or more RATs. Although the resource schedulers are described as scheduling BW resources, the resource schedulers are not limited thereto and may be used to schedule other types of resources, including, without limitation, transmission power on various defined carrier frequencies, etc.

Figure 3:
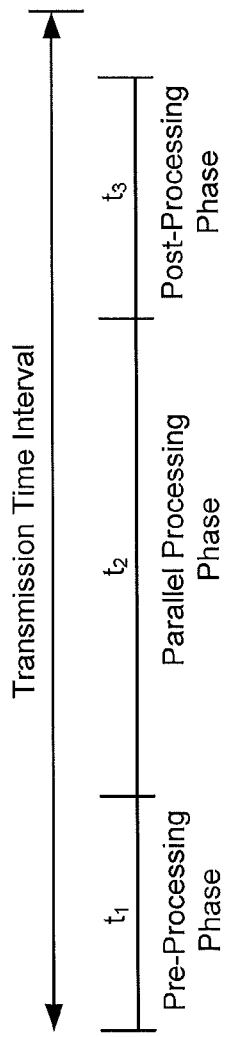
FIG. 3 is a timing diagram that illustrates scheduling process phases that are repeated for each transmission time interval according to some embodiments of the present invention.

Various embodiments of the present invention are directed to dividing at least a portion of a frequency and time resource scheduling process into parallel processes that can be computed independently of each other. Speed of the scheduling process may be increased by performing at least some of the parallel processes on separate processors. The scheduler may thereby have sufficient capacity to handle increased numbers and/or complexity of scheduling rules and/or to respond to faster changing channel conditions. FIG. 3 is a timing diagram that illustrates phases of a scheduling process that is repeated for each transmission time interval (TTI) to assign frequency and time resource elements to user equipment nodes UEs, a network node, and/or to other communication nodes. The scheduling process is divided into a pre-processing phase that is carried out in interval $t_1$ a parallel processing phase that is carried out in interval $t_2$, and a post-processing phase that is carried out in interval $t_3$. The total processing time to complete the pre-processing, parallel processing, and post-processing phases can be referred to as the "scheduling epoch" and should be, but is not required to be, completed in less time than the duration of a TTI.

Figure 5:
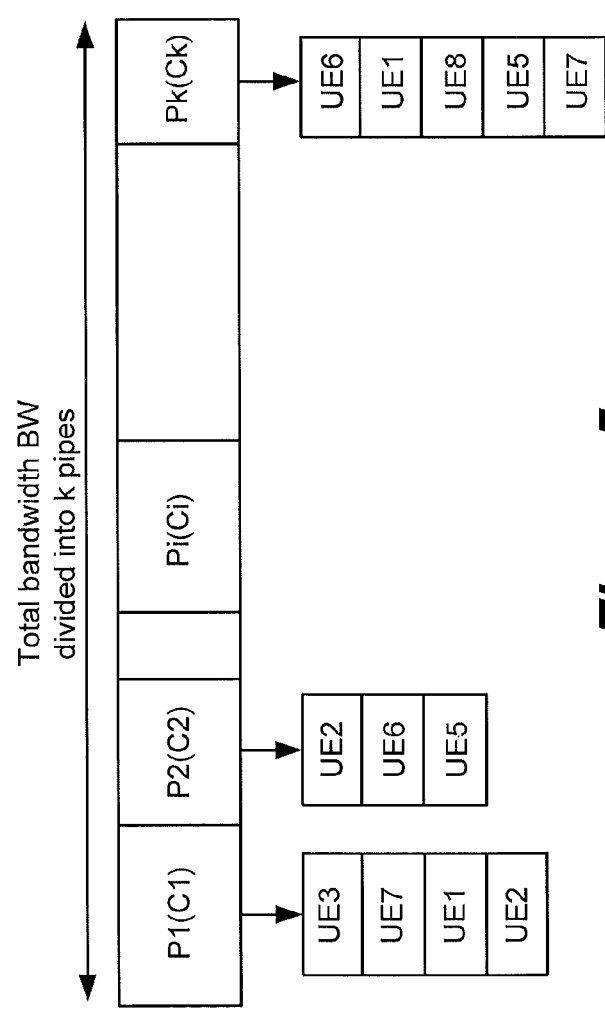
FIG. 5 is a block diagram of exemplary operations and methods that may be carried out during the pre-processing phase of FIG. 4 according to some embodiments of the present invention.
Figure 4:
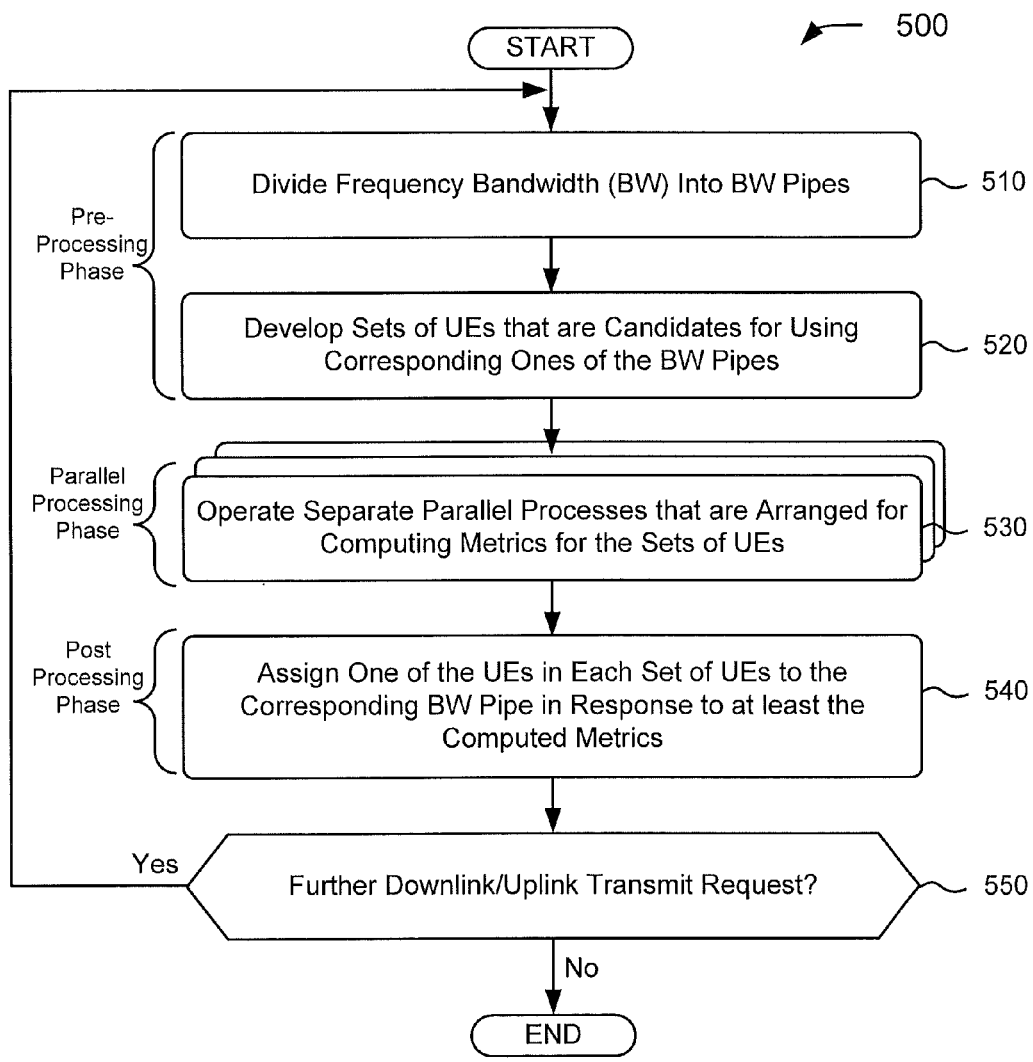
FIG. 4 is a flowchart of exemplary operations and methods that may be carried out in each of the pre-processing, parallel processing, and post-processing phases shown in FIG. 3 according to some embodiments of the present invention.

FIG. 4 illustrates exemplary operations and methods (500) that may be carried out in each of the phases (pre-processing, parallel processing, and post-processing) to complete the scheduling process. FIG. 5 illustrates further exemplary operations and methods that may be carried out during the pre-processing phase to setup and enable efficient computational processing during the parallel processing phase. Referring to FIGS. 4 and 5, the total available frequency bandwidth BW is divided (Block 510) into a plural number k of pipes "Pi", where i=1, ..., k. Each pipe has an associated utilization cost function "C". In the exemplary embodiment of FIG. 5, the total bandwidth BW is divided into pipes P1(C1), P2(C2), Pi(Ci), ... Pk(Ck). At least some of the pipes Pi will typically have different sizes in the frequency domain, and the sizes of the divided pipes Pi can vary dynamically from one TTI to another. The sizes of individual pipes Pi may be determined responsive to, for example, number or UEs, channel quality measurements, the amount of downlink/uplink data awaiting transmission, how many UEs are awaiting downlink/uplink transmissions, priority levels and/or Quality of Service (QoS) levels that are defined for individual UEs, and/or other parameters such as those described below and which may have been determined during scheduling of one or more earlier transmission time intervals. The processing demands of the pre-processing phase can be decreased by defining at least some or all of the pipes Pi to have the same size or different but predetermined sizes.

Still during the pre-processing phase, sets of UEs are developed (Block 520) that are candidates for using corresponding ones of the BW pipes. The determination of which UEs are candidates for BW pipes may be made responsive to uplink buffer status reports that are transmitted from the UEs to the radio base station node (eNodeB), associated with the scheduler, and which indicate how many data bits the UEs have buffered awaiting uplink transmission to the radio base station (eNodeB). Alternatively or additionally, UEs may be identified as candidates responsive to a downlink buffer status of the radio base station node (eNodeB) which indicates how many downlink data bits are queued awaiting transmission to identified UEs or for broadcast to UEs.

The determination of which UEs to include in which of the sets (Block 520) can be carried out based on utilization cost functions of the different BW pipes and/or based on communication metrics associated with the UEs. Exemplary utilization cost functions of the BW pipes that may be computationally evaluated during the development of the sets can include, but are not limited to, a present Signal-to-Interference-and-Noise-Ratio (SINR) and/or Gain-to-Noise Ratio (GINR) of a certain BW pipe, maximizing the transport block size (TBS), minimizing interference to a neighboring cell(s), and/or combinations of these or other cost functions (e.g., minimizing interference to a neighboring cell while achieving a defined TBS), etc. Exemplary communication metrics for UEs that may be computationally evaluated during the development of the sets can include, but are not limited to, the number of downlink/uplink data bits awaiting transmission to/from respective UEs, defined QoS levels for UEs, and/or defined priority levels for UEs (e.g., high priority/QoS UEs may be mapped to a plurality of BW pipes or to all BW pipes), present waiting communication delay (e.g., UE priority level increases as function of present delay waiting to communicate), etc.

For example, a UE with a larger uplink/downlink data bit buffer may be included in a set that corresponds to a larger size BW pipe and/or included in more than one set. Conversely, a UE with a smaller uplink/downlink data bit buffer may be included in a set corresponding to a smaller size BW pipe and/or to a few number of sets. Furthermore, the utilization cost functions of the BW pipes may be used to predict the transport block size (TBS) (i.e., number of bits that can be communicated during a TTI) for the BW pipes, and the TBS may be compared to the uplink/downlink data bit buffers to map the UEs to the sets.

Accordingly, during the development of the sets of nodes (Block 520), a set of candidate UEs is generated for each BW pipe for a particular TTI. In the exemplary embodiment of FIG. 5, a first set has been generated that maps UE3, UE7, UE1, and UE2 to BW pipe P1, another set has been generated that maps UE2, UE6, and UE5 to another BW pipe P2, and so on for other BW pipes with a last set mapping UE6, UE1, UE8, UE5, and UE7 to the last BW Pipe Pk. Some UEs may be included in more than set corresponding to more than one BW pipe (e.g., UE1, UE2, UE6, and UE7) in response to, for example, those UEs having more than a threshold amount of data awaiting uplink/downlink transmission and/or having at least a defined priority level and/or QoS level. Some UEs may be semi-persistently scheduled to use a same BW pipe for a series of TTIs responsive to a priority level and/or QoS level defined for the UE and/or services associated with the UE (e.g., voice phone call versus low priority packet data).

Although various scheduling is described in the context of developing sets of candidate UEs for assignment to BW pipes, it is to be understood that other type of nodes may be grouped into sets as candidates for assignment to BW pipes. For example, because a radio base station node may broadcast data to some/all UEs within its service cell, where the UEs are not necessarily known by the eNodeB or identified in the transmission, the resource scheduler may group more general node identifiers (e.g., a flag indicating broadcast to all nodes) into sets. Accordingly, the schedulers can be configured to more generally schedule resources for nodes that communicate with a network node of a radio access network (e.g., LTE or other RAT).

During the parallel processing phase, the resource scheduler operates separate parallel processes (Block 530) that are arranged to compute metrics for the sets of UEs. For example, the resource scheduler can operate a first process to sequentially compute metrics for each UE in the first set (i.e., UE3, UE7, UE1, UE2 mapped to P1), operate a second process to sequentially compute metrics for each UE in the second set (i.e., UE2, UE6, UE5 mapped to P2), and so on for each of the other sets, including another process to sequentially compute metrics for each UE in the set corresponding to the last BW pipe (i.e., UE6, UE1, UE8, UE5, UE7 mapped to Pk). Some or all of the processes may be executed by different microprocessors so that at least some of the processes are simultaneously carried out, as will be described in further detail below with regard to FIG. 8. For example, while the first process is being executed by one processor to compute metrics for UE3, UE7, UE1, UE2 in the set associated with the first BW pipe P1, the second process is simultaneously executed by another processor to compute metrics for UE2, UE6, UE5 in the set associated with the second BW pipe P2, and so on with other individual processes being simultaneously executed by yet other respective processors to compute metrics for the UEs in at least some of the other sets.

The efficiency of the parallel processing can quickly degrade if the processes of the parallel processing phase are dependent upon each other, such as if they must pause to share data therebetween while computing the UE metrics. In some embodiments, the processes are configured so that their operations to generate UE metrics for their respective BW pipes can be performed independently of (e.g., without requiring exchange of data with) the other processes for the other BW pipes. Accordingly, in the example above, the first, second, and other processes can be configured to simultaneously and independently compute metrics for the candidate UEs in a plurality of different sets. The processes may be made independent of one another by dividing the total available frequency bandwidth BW (in Block 510) into non-overlapping BW pipes (i.e., the BW pipes have non-overlapping frequency ranges). Accordingly, the process for computing metrics for UEs in a set associated with one BW pipe can be carried out independent of the process for computing metrics for UEs in another set associated with another BW pipe. These independent processes may be simultaneously carried out on different microprocessors that are operating in parallel, may be carried out on different processing core circuits within a common microprocessor, and/or may be carried out as independent operational threads that are carried out in parallel on a single microprocessor/processing core circuit.

When the resource scheduler includes a plurality of microprocessors and/or a plurality of processing core circuits within a single microprocessor, the total available frequency bandwidth BW can be divided into a number of BW pipes that is an integer multiple of the number of parallel processors/processing cores (in Block 510) that are operated (in Block 530) to compute the candidate UE metrics. For example, when a resource scheduler includes 5 parallel processors, the total frequency bandwidth may be divided into a number of BW pipes that is an integer multiple of 5 (e.g., 5, 10, 15, ... ). By further example, when the resource scheduler includes 5 parallel processors and the total frequency bandwidth is divided into 15 non-overlapping pipes, the associated 15 processes to calculate the UE metrics for all 15 BW pipes can be completed in three cycles each of which simultaneously computes UE metrics for 5 of the BW pipes in parallel.

Figure 6:
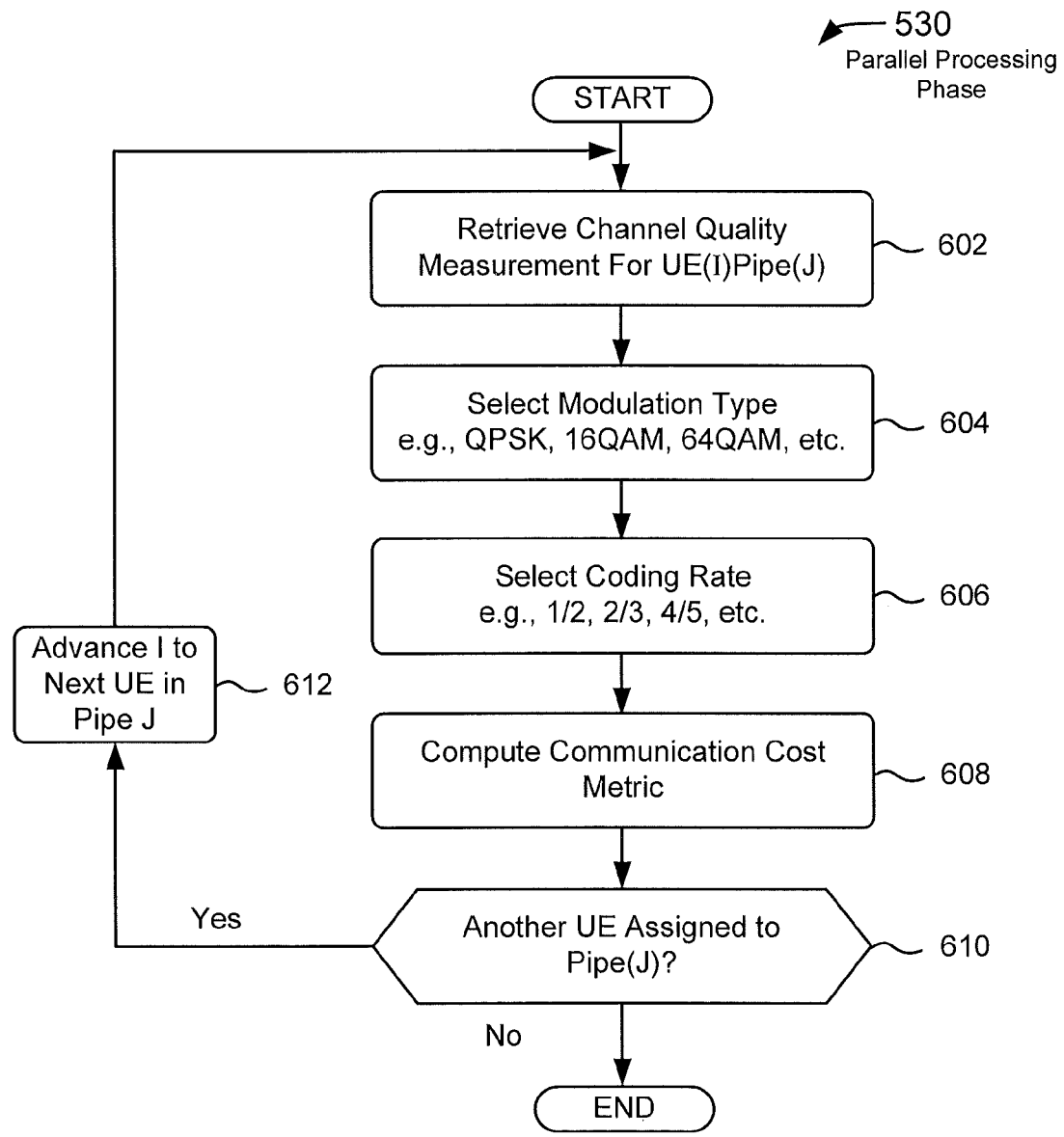
FIG. 6 is a flowchart of exemplary operations and methods that may be carried out in the parallel processing phase of FIG. 4 according to some embodiments of the present invention.

FIG. 6 shows exemplary operations and methods that may be carried out during the parallel processing phase (Block 530) by each of the parallel executed processes to compute metrics for each candidate UE in the sets. For a particular combination of UE(I) and BW pipe (J), the operations retrieve (Block 602) a channel quality measurement (CQM). The channel quality measurement may be determined from channel-status reports that are provided by the UE(I) to the radio base station node (eNodeB), and which indicate instantaneous downlink channel quality in both time and frequency domain. UE(I) may, for example, determine downlink channel quality by measuring a reference signal that is transmitted on the downlink from the radio base station node (eNodeB) to UE(I). Alternatively or additionally, the channel quality measurements may be carried out by the radio base station node (eNodeB) on uplink transmissions from UE(I).

The channel quality measurement is used to select a modulation and coding scheme from among a plurality of different modulation and coding schemes for use in communicating data from and/or to UE(I). For example, the channel quality measurement may be used to select (Block 604) a modulation type from among a plurality of different defined modulation types (e.g., QPSK (quadrature phase-shift keying), 16QAM (quadrature amplitude modulation), 64 QAM, etc.), and may be further used to select (Block 606) a coding rate from among a plurality of different defined coding rates (e.g., ½, ⅔, ⅘, etc.). A communication cost metric (e.g., Raw Bit Information Rate (RBIR)) is calculated (Block 608) for UE(I) based on the selected modulation and coding scheme.

The operations of Blocks 602-608 can be repeated for all other UEs that are in the same set (corresponding to the same BW pipe (J)) to calculate their respective communication cost metrics. Accordingly, when another candidate UE is assigned to the BW pipe J (Block 610), the pointer (I) can be advanced to the next UE in the set associated with BW pipe (J) and the operations of Blocks 602-608 can be repeated.

Referring again to FIG. 4, during the post processing phase (Block 540), the resource scheduler uses the calculated UE metrics (from Block 530) to further determine assignments of UEs to BW pipes, and refines the assignments of UEs to different BW pipes in order to satisfy defined rules. Through the assignment process the resource scheduler generates final assignments of one of the nodes in each set of nodes to the corresponding bandwidth pipe. The resource scheduler may further control the radio base station node (eNodeB) to communicate the assignments to the UEs. The radio base station node (eNodeB) is controlled to simultaneously communicate downlink data to the UEs during the communication time interval using respective BW pipes that are identified by the assignments, and/or is controlled to simultaneously receive uplink data from the UEs during the communication time interval using respective BW pipes that are identified by the assignments.

Figure 7:
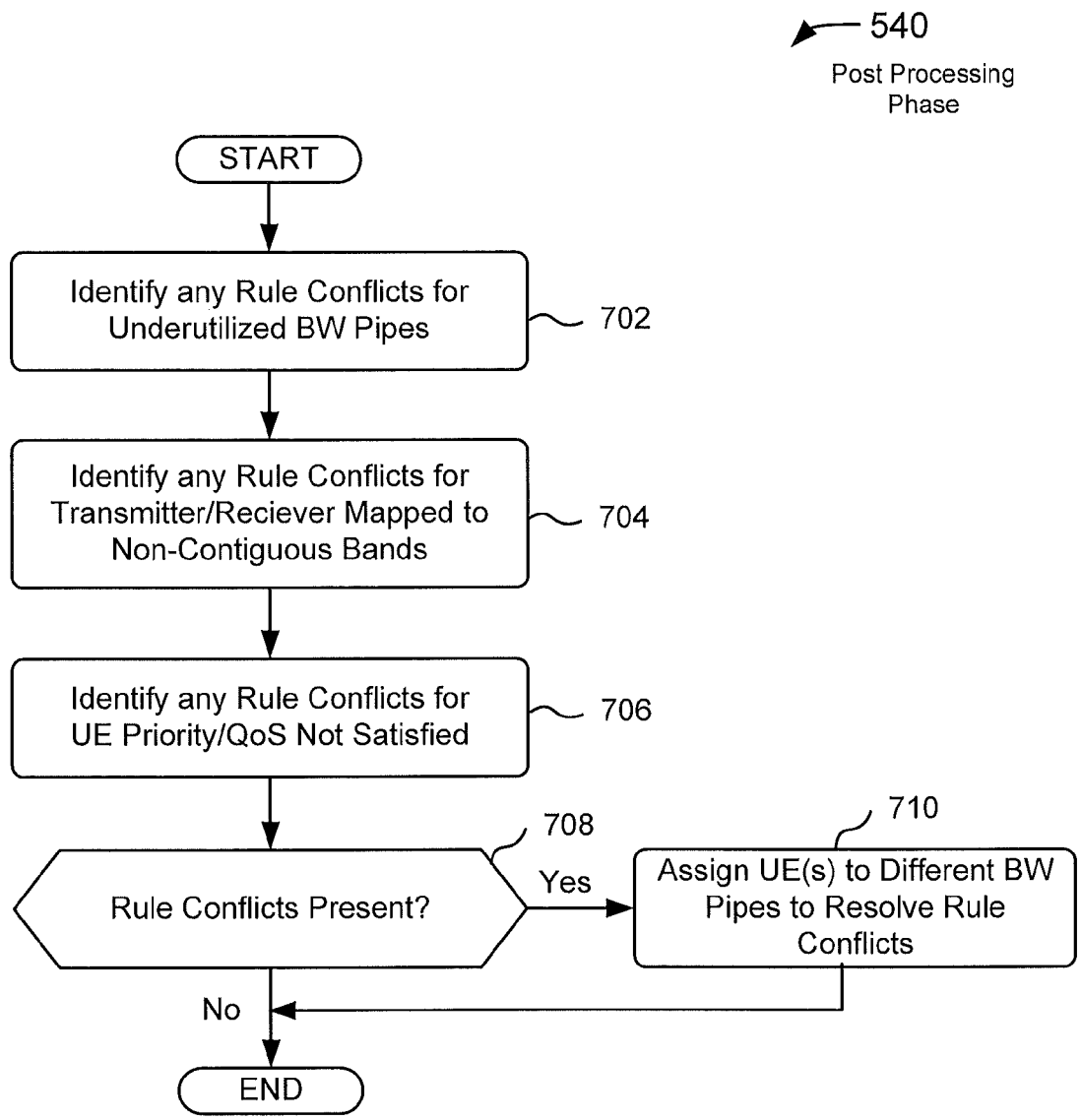
FIG. 7 is a flowchart of exemplary operations and methods that may be carried out in the post-processing phase of FIG. 4 according to some embodiments of the present invention.

FIG. 7 shows exemplary operations and methods that may be carried out during the post processing phase (Block 540), and which may be executed by a single microprocessor/processing core circuit. Referring to FIG. 7, the resource scheduler identifies any rule conflicts relating to underutilized BW pipes (Block 702), For example, the modulation and coding scheme that has been selected for a UE during the parallel processing phase (Block 530) may result in a queued data block being able to be transmitted much faster than was expected during the initial mapping of the preprocessing phase (at Block 520) and, consequently, that UE can be assigned (Block 710) to a smaller size BW pipe and/or more data may be scheduled for transmission to/from that UE (depending upon how much data is buffered awaiting transmission). In contrast, the selected modulation and coding scheme for another UE may result in the transmission of a queued data block taking more time than was expected (at Block 520) and, consequently, that UE may be assigned (Block 710) to a larger size BW pipe or another candidate UE may be assigned to that BW pipe.

A further determination may be made to identify other rule conflicts, such as whether a UE that is configured to transmit or receive using a single carrier is presently mapped to two or more BW pipes having non-contiguous frequency bands (e.g., illustrated in FIG. 5 for UE7 in two sets associated with spaced-apart BW pipes 1 and k). The resource scheduler may then assign the UE to a single BW pipe or to contiguous BW pipes, may assign a further BW pipe(s) to the UE to create contiguous frequency band, or may not schedule that UE and assign the corresponding BW pipes to other UEs.

A further determination may be made to identify other rule conflicts, such as whether a defined priority and/or QoS level for a UE will not be satisfied by the present mapping. For example, a UE that is to be provided a high priority/QoS level may need to be assigned to use a BW pipe before another lower priority/QoS level candidate UE. Alternatively or additionally, the high priority/QoS level UE may need to be assigned to use more BW pipes and/or assigned to use a larger BW pipe than is provided by the present assignments.

When one or more rule conflicts have been identified (Block 708), the resource scheduler can resolve those conflicts by refining the assignments of one of UE from each set to the corresponding BW pipe. For example, unutilized frequency bandwidth of an underutilized BW pipe may be allocated to an adjacent BW pipe that will be overutilized, a UE that will underutilize its presently assigned BW pipe(s) can be reassigned to a smaller BW pipe and/or to fewer BW pipes, and/or the presently assigned UE may be replaced with another UE from the set of candidate UEs. It is noted that the communication cost metrics calculated during the parallel processing phase (Block 530) can be reused during the post-processing phase to reassign UEs among the BW pipes without requiring recalculation of the communication cost metrics for any of the UEs, although the communication cost metrics may be at least partially recalculated for a particular UE when, for example, that UE is reassigned to a larger/smaller BW pipe and/or to a BW pipe having a substantially different utilization cost function.

Through the above-process, the resource scheduler generates assignments of one of the nodes in each set of nodes to the corresponding bandwidth pipe, and can further control the radio base station node (eNodeB) to communicate the assignments to the UEs. As was explained above, for some types of scheduled transmissions from the radio base station node, such as broadcast transmissions, the broadcast transmission may be assigned to BW pipes, and the assignments may or may not be transmitted from the radio base station node to UEs.

Referring again to FIG. 4, the resource scheduler, in some embodiments, may return to the preprocessing phase (Block 510-520) from the post processing phase (Block 540) to vary the size of one or more of the BW pipes and then repeat at least the post processing phase (Block 540) to generate assignments of UEs to the resized BW pipe(s). For example, when a large size BW pipe is determined during the post processing phase to have insufficient utilization, the resource scheduler may sub-divide that BW pipe into two or more new BW pipes and then repeat at least a portion of the above-described process to assign UEs to the new BW pipes for communication during the transmission time interval.

The resource scheduler repetitively carries-out the preprocessing phase (Block 510-520), the parallel processing phase (Block 530), and the post processing phase (Block 540) for subsequent transmission time intervals. Accordingly, the resource scheduler may determine (Block 550) whether there are further downlink/uplink transmit requests that need to be scheduled for communication through a subsequent transmission time interval and, if so, the above scheduling phases are repeated.

Figure 8:
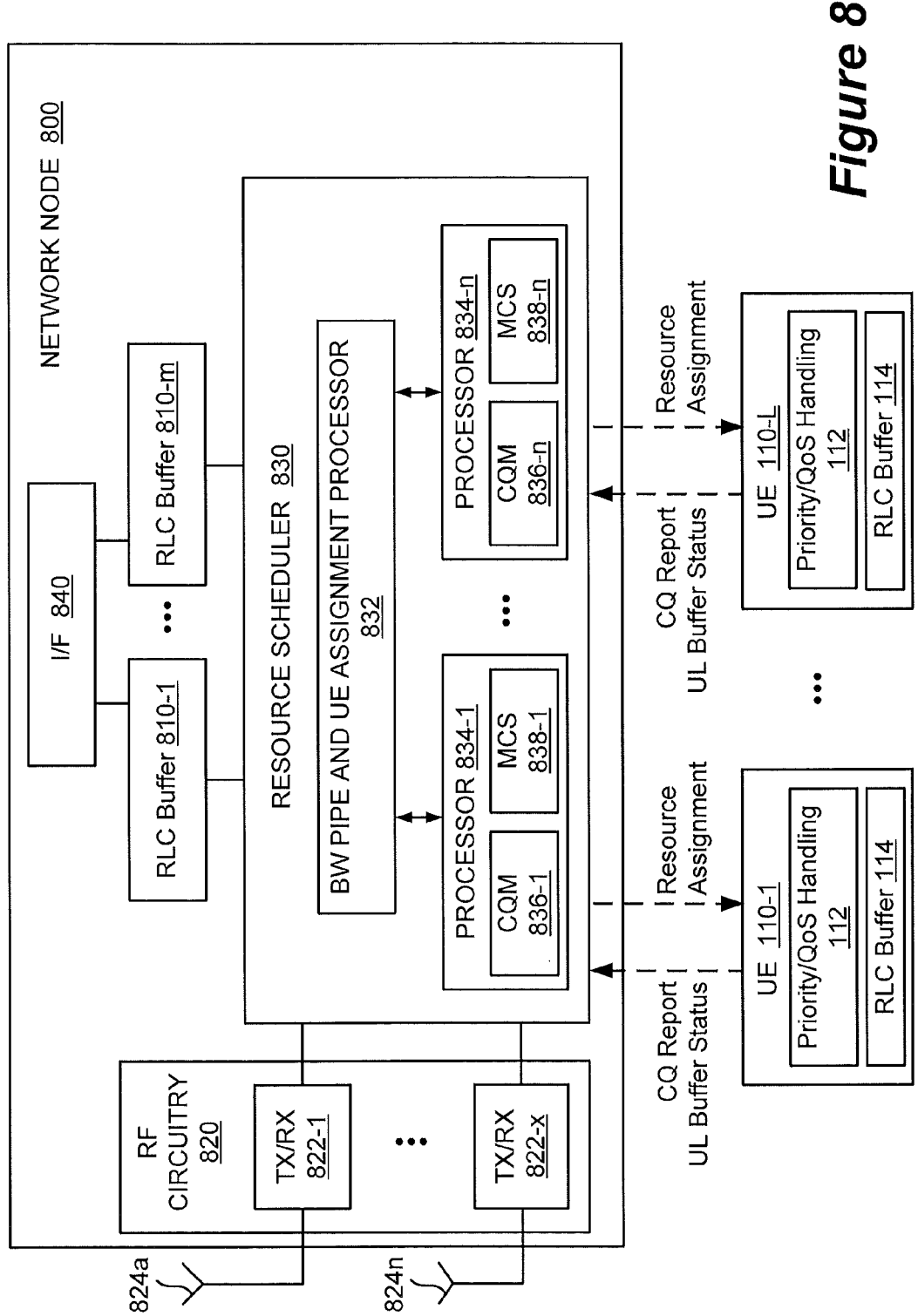
FIG. 8 is a block diagram of a portion of a network node that is configured according to some embodiments of the present invention and which may be used in each of the radio base station nodes (eNodeBs) of FIG. 1.

FIG. 8 is a block diagram of a portion of a network node 800 that is configured according to some embodiments of the present invention and which may be used in each of the radio base station nodes (eNodeBs) of FIG. 1. Referring to FIG. 8, the network node 800 includes a resource scheduler circuit 830 that may be configured to perform the operations and methods of FIGS. 3-7. The resource scheduler 830 may include a plurality of processor circuits, which may correspond to separately packaged microprocessors and/or which may correspond to multiple processing core circuits within a microprocessor. An assignment processor 832 is configured to serially perform the operations of the pre-processing phase (e.g., Blocks 510 and 520) and the operations of the post processing phase (e.g., Block 540).

Parallel processor circuits 834-1 to 834-$n$ (where n is a plural integer) are configured to simultaneously perform the operations of the parallel processing phase (e.g., Block 530). Each of the parallel processor circuits 834-1 to 834-$n$ can be configured to perform operations to compute channel quality measurement metrics (CQM 836-1 to 836-$n$) and to perform operations to compute modulation and coding scheme metrics (MCS 838-1 to 838-$n$) as described above. Accordingly, the processes for computing metrics for UEs in at least some of the different sets can be carried out on different ones of the parallel processors 834-1 to 834-$n$ so that they are simultaneously performed. Thus, the process for computing metrics for candidate UEs in a first set can be carried out on one of the parallel processors 834-1 to 834-$n$, the process for computing metrics for candidate UEs in another set can be carried out on another one of the parallel processors 834-1 to 834-$n$, and so on with other processes for other sets being carried out on other parallel processors 834-1 to 834-$n$ up to the number of parallel processors (n). When the number of sets exceeds the number of parallel processors (n), the corresponding excess processes can be performed by the parallel processors 834-1 to 834-$n$ during subsequent processing cycles. For example, the processes to compute metrics for UEs in six sets can be performed three-at-a-time in parallel during two cycles using three of the parallel processors 834-1, 834-2, and 834-3.

Figure 2:
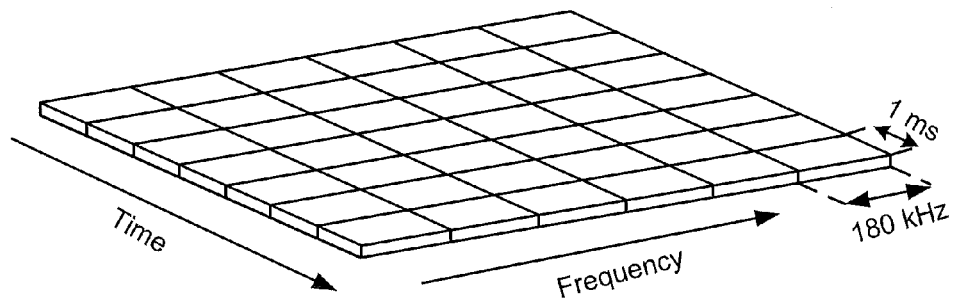
FIG. 2 illustrates a conventional resource grid of frequency and time resource elements that can be scheduled for communication use between a network node and UEs.

The network node 800 includes RF circuitry 820 having a plurality of transceivers (TX/RX) 822-1 to 822-$x$ that communicate at different frequency subcarriers through antennas 824$a$-$n$ to provide the exemplary multiple carrier portion of the resource grid shown in FIG. 2. Although an exemplary one-to-one mapping of transceivers to antennas is shown, it is to be understood that any number of antennas may be used depending upon antenna configuration and design constraints. The resource scheduler 830 schedules the UEs 110-1 to 110-L to use the frequency and time resource elements (REs) responsive to the scheduling processes described above.

The network node 800 can be configured to receive channel quality (CQ) reports, uplink (UL) buffer status reports, and communication priority/QoS level indicators from the UEs 110-1 to 110-L, which are passed to the resources scheduler 830 for processing as described above. The CQ reports can indicate instantaneous downlink channel quality in both time and frequency domain. The UL buffer status reports can indicate how many data bits are buffered by a UE for uplink transmission (i.e., by the RCL buffer circuit 114). The UEs can communicate their communication priority/QoS level (i.e., by the priority/QoS handling circuit 112) within the CQ report or separately therefrom.

The network node 800 can also include a plurality of radio link control protocol buffers 810-1 to 810-M where downlink data that is received from the core network 130, via the interface (I/F) 840, is buffered awaiting transmission to addressed UEs. As explained above, the pre-processing and post processing phases of the resource scheduler 830 can be performed dependent upon the number of data bits awaiting downlink communication to identified UEs.

As explained above, the resource scheduler 830 can divide the total available bandwidth into non-overlapping BW pipes so that during the parallel processing phase at least some of the processes can be simultaneously performed in parallel to each other and independent of each other on the parallel processors 834-1 to 834-$n$ to maximize their computational throughput of those processes on the parallel processors 834-1 to 834-$n$. Computational throughput of the resource scheduler 830 can thereby be substantially increased relative to a more serialized processing approach, which may enable the resource scheduler 830 to handle increased numbers and/or complexity of scheduling rules and/or to respond to faster changing channel conditions.

Many variations and modifications can be made to the embodiments without substantially departing from the principles of the present invention. All such variations and modifications are intended to be included herein within the scope of the present invention, as set forth in the following claims.

What is claimed is:

1. A network node of a radio access network, the network node comprising:
   a scheduler that is configured to divide a defined frequency bandwidth into a plurality of bandwidth pipes,
   wherein the scheduler is further configured to develop sets of nodes that are candidates for using corresponding ones of the bandwidth pipes to communicate with the network node during a communication time interval,
   wherein at least one of the sets of nodes contains a plurality of candidate nodes,
   wherein the scheduler is further configured to operate separate parallel processes that are arranged for computing metrics for the sets of nodes, and
   wherein the scheduler is further configured to assign one of the nodes in each set of nodes to the corresponding bandwidth pipe in response to the computed metrics.

2. The network node of claim 1, wherein:
   the scheduler is further configured to operate a plural number of parallel processors to compute the metrics for the sets of nodes.

3. The network node of claim 2, wherein:
   the parallel processors are configured to compute the metrics as communication cost metrics based on at least channel quality measurements from the respective candidate nodes to the network node and/or from the network node to the respective candidate nodes.

4. The network node of claim 1, wherein:
   the scheduler is further configured to divide the defined frequency bandwidth into a plurality of bandwidth pipes that correspond to non-overlapping portions of the defined frequency bandwidth.

5. The network node of claim 1, wherein:
   the scheduler is further configured to divide the defined frequency bandwidth into a number of bandwidth pipes that is an integer multiple of the number of parallel processes that are operated to compute the metrics for the candidate nodes.

6. The network node of claim 1, wherein:
the scheduler is further configured to operate the parallel processes so that the metrics for the candidate nodes in one set are computed independently from the candidate nodes in another set.

7. The network node of claim 6, wherein:
the scheduler is further configured to operate a first one of the parallel processes to compute a metric for one of the candidate nodes in a first set of nodes, to operate a second one of the parallel processes to compute a metric for one of the candidate nodes in a second set of nodes, and to operate a third one of the parallel processes to compute a metric for one of the candidate nodes in a third set of nodes, wherein the first, second, and third parallel processes are operated to simultaneously and independently compute the metrics.

8. The network node of claim 1, wherein:
the scheduler is further configured to operate each of the parallel processes to compute the metrics based on channel quality measurements from the network node to respective ones of the candidate nodes and/or from respective ones of the candidate nodes to the network node.

9. The network node of claim 8, wherein:
the scheduler is further configured to operate each of the parallel processes to compute the metrics by selecting a modulation and coding scheme from among a plurality of different modulation and coding schemes for communication from and/or to individual ones of the candidate nodes responsive to the channel quality measurements.

10. The network node of claim 9, wherein:
the scheduler is further configured to select the modulation and coding scheme by selecting a modulation type among a plurality of different modulation types and by selecting a coding rate among a plurality of different coding rates responsive to the channel quality measurements.

11. The network node of claim 9, wherein:
the scheduler is further configured to perform the assignment of one of the candidate nodes in each set of nodes to the corresponding bandwidth pipe in response to the modulation and coding scheme selected for the respective candidate nodes.

12. The network node of claim 11, wherein:
the scheduler is further configured to perform the assignment of one of the candidate nodes in each set of nodes to the corresponding bandwidth pipe in response to the selected modulation and coding scheme, the bandwidth size of the bandwidth pipes, and how much data is buffered awaiting transmission from/to the candidate nodes.

13. The network node of claim 1, wherein:
the scheduler is further configured to perform the assignment of one of the candidate nodes in each set of nodes to the corresponding bandwidth pipe in response to whether any candidate node that will receive and/or transmit using a single carrier is presently associated with non-continuous bandwidth pipes.

14. The network node of claim 1, wherein:
the scheduler comprises a downlink scheduler that is configured to communicate the assignments to the assigned nodes and to control the network node to simultaneously communicate downlink data to the assigned nodes during the communication time interval using the respective bandwidth pipes that are identified by the assignments.

15. The network node of claim 14, wherein:
the scheduler is further configured to determine sizes for individual ones of the bandwidth pipes responsive to how much downlink data is buffered at the network node awaiting transmission to individual ones of the candidate nodes.

16. The network node of claim 14, wherein:
the scheduler is further configured to determine how many of the bandwidth pipes to assign for use by the network node to transmit downlink data to individual ones of the candidate nodes responsive to how much downlink data is buffered at the network node awaiting transmission to the respective candidate nodes.

17. The network node of claim 1, wherein:
the scheduler is further configured to communicate the assignments to the assigned nodes and to control the network node to simultaneously receive uplink data from the assigned nodes during the communication time interval using the respective bandwidth pipes that are identified by the assignments.

18. The network node of claim 17, wherein:
the scheduler is further configured to receive uplink buffer status reports from the candidate nodes and to select particular ones of the candidate nodes for assignment to the bandwidth pipes in response to the buffer status reports indicating that uplink data is awaiting transmission to the network node.

19. The network node of claim 17, wherein:
the scheduler is further configured to determine sizes for individual ones of the bandwidth pipes responsive to an indication in respective ones of the uplink buffer status reports as to much uplink data is awaiting transmission to the network node.

20. The network node of claim 17, wherein:
the scheduler is further configured to determine how many of the bandwidth pipes to assign for use by individual ones of the candidate nodes responsive to an indication in respective ones of the uplink buffer status reports as to much uplink data is awaiting transmission to the network node.

21. The network node of claim 17, wherein:
the scheduler is further configured to determine sizes for individual ones of the bandwidth pipes responsive to an indication in respective ones of the uplink buffer status reports as to a communication priority level for the candidate nodes.

22. The network node of claim 1, wherein:
the scheduler is further configured to communicate the assignments to the assigned nodes for use in the communication time interval, and to repetitively carry-out at least the development of sets of nodes that are candidates for using corresponding ones of the bandwidth pipes, the operation of the separate parallel processes that are arranged for computing metrics for the sets of nodes, the assignment of one of the nodes in each set of nodes to the corresponding bandwidth pipe in response to the computed metrics, and the communication of the assignments to the candidate nodes for subsequent communication time intervals.

23. A method of scheduling comprising:
dividing a defined frequency bandwidth into a plurality of bandwidth pipes;
developing sets of nodes that are candidates for using corresponding ones of the bandwidth pipes to communicate with the network node during a communication time interval, wherein at least one of the sets contains a plurality of candidate nodes;
operating separate parallel processes that are arranged for computing metrics for the sets of nodes; and assigning one of the nodes in each set of nodes to the corresponding bandwidth pipe in response to the computed metrics.

\* \* \* \* \*